(12) United States Patent
Kim et al.

(10) Patent No.: US 10,629,944 B2
(45) Date of Patent: Apr. 21, 2020

(54) BATTERY CELL

(71) Applicant: SK Innovation Co., Ltd., Seoul (KR)

(72) Inventors: Tae Il Kim, Daejeon (KR); Dong Ju Kim, Daejeon (KR); Jin Go Kim, Daejeon (KR); Seung Noh Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 285 days.

(21) Appl. No.: 15/407,020

(22) Filed: Jan. 16, 2017

(65) Prior Publication Data

US 2017/0207483 A1    Jul. 20, 2017

(30) Foreign Application Priority Data

Jan. 18, 2016    (KR) .................. 10-2016-0006074

(51) Int. Cl.
| | | |
|---|---|---|
| *H01M 10/04* | (2006.01) | |
| *H01M 2/02* | (2006.01) | |
| *H01M 2/06* | (2006.01) | |
| *H01M 2/08* | (2006.01) | |
| H01M 10/058 | (2010.01) | |
| H01M 10/052 | (2010.01) | |

(52) U.S. Cl.
CPC ....... *H01M 10/0468* (2013.01); *H01M 2/021* (2013.01); *H01M 2/06* (2013.01); *H01M 2/08* (2013.01); *H01M 10/0413* (2013.01); *H01M 10/0436* (2013.01); *H01M 10/052* (2013.01); *H01M 10/058* (2013.01)

(58) Field of Classification Search
CPC .......... H01M 2/0275; H01M 10/0468; H01M 10/0436; H01M 2/021; H01M 10/0413; H01M 2/08; H01M 2/06; H01M 10/058; H01M 10/052
See application file for complete search history.

(56) References Cited

U.S. PATENT DOCUMENTS

| | | | |
|---|---|---|---|
| 2003/0049527 A1* | 3/2003 | Yageta ................ | H01M 2/021 429/179 |
| 2004/0048149 A1* | 3/2004 | Gross ................ | H01M 2/0267 429/127 |
| 2005/0079757 A1* | 4/2005 | Watanabe .......... | H01M 2/0277 439/500 |
| 2007/0231683 A1* | 10/2007 | Lee ...................... | H01M 2/021 429/161 |
| 2010/0047685 A1* | 2/2010 | Lee ...................... | H01M 2/021 429/176 |
| 2010/0143787 A1* | 6/2010 | Jung .................. | H01M 2/021 429/162 |

(Continued)

FOREIGN PATENT DOCUMENTS

KR    1020110105737    9/2011

*Primary Examiner* — Michael L Dignan
(74) *Attorney, Agent, or Firm* — IP & T Group LLP

(57) ABSTRACT

A battery cell comprises a case including a sidewall portion defined as a depth of a receiving space and a planar portion extended from the sidewall portion and completing the receiving space; and an electrode assembly formed in such a manner that a plurality of electrode plates are stacked and accommodated in the receiving space of the case. In addition, the sidewall portion includes a first side wall and a second side wall protruding outwardly of the first side wall and expanding the receiving space.

10 Claims, 5 Drawing Sheets

(56) References Cited

U.S. PATENT DOCUMENTS

| | | | |
|---|---|---|---|
| 2011/0064991 A1* | 3/2011 | Ahn | H01M 2/021 |
| | | | 429/153 |
| 2011/0274955 A1 | 11/2011 | Park et al. | |
| 2011/0287308 A1* | 11/2011 | Kim | B29C 43/18 |
| | | | 429/176 |
| 2013/0216880 A1* | 8/2013 | Park | H01M 2/0212 |
| | | | 429/94 |
| 2016/0240325 A1* | 8/2016 | Tajima | H01G 11/82 |
| 2016/0343999 A1* | 11/2016 | Yonemura | H01M 2/0275 |

* cited by examiner

BATTERY CELL

CROSS-REFERENCE TO RELATED APPLICATION

This application claims benefit of priority to Korean Patent Application No. 10-2016-0006074 filed on Jan. 18, 2016 in the Korean Intellectual Property Office, the disclosure of which is incorporated herein by reference in its entirety.

BACKGROUND

1. Field

The present inventive concept relates to a battery cell having a maximum internal space.

2. Description of Related Art

In general, secondary batteries may be rechargeable, have high capacity, and include nickel-cadmium (Ni—Cd) batteries, nickel-hydride (Ni—H) batteries, lithium-ion (Li-ion) batteries, and the like. Li-ion batteries, among the batteries described above, have received attention as next generation power sources due to excellent characteristics thereof, such as long lifespan, high capacity, and the like.

Li secondary batteries may have an operating voltage at a level of 3.6 V or higher and may be used to power portable electronic devices. Alternatively, several Li secondary batteries may be connected in series and be used in high-output hybrid vehicles. The use of Li secondary batteries has increased rapidly due to an operating voltage thereof, which is three times higher than that of Ni—Cd batteries or nickel-metal hybrid (N-MH) batteries, and relatively high energy density per unit of weight.

In general, Li secondary batteries may be manufactured based on battery cell units. In addition, according to a form of an exterior material, Li secondary batteries may be classified into can-type secondary batteries, in which an electrode assembly is embedded in a metallic can, and pouch-type secondary batteries, in which an electrode assembly is embedded in a pouch of an aluminum (Al) laminate sheet.

In general, the battery cells described above may be manufactured in such a manner that an electrolyte is injected thereinto, and an exterior material is sealed, with an electrode assembly included in the exterior material.

FIG. 1 is an exploded perspective view of a composition of a related art pouch-type battery cell, while FIG. 2 is a perspective view illustrating an assembled state of the battery cell illustrated in FIG. 1. In addition, FIG. 3 is a cross-sectional view taken along line I-I' of FIG. 2.

With reference to FIGS. 1 to 3, the related art pouch-type battery cell may generally include an electrode assembly 10 and a pouch-type case 20 including the electrode assembly 10.

In this case, the electrode assembly 10 may include an electrode plate, that is, an anode plate and a cathode plate. In addition, a separator (not illustrated) may be interposed between the anode plate and the cathode plate. Furthermore, each of the anode plate and the cathode plate may include one or more electrode taps 11, that is, an anode tap and a cathode tap.

The anode tap and the cathode tap may be connected to an electrode lead 12, that is, to an anode lead and a cathode lead, respectively. In addition, a portion of the anode lead and the cathode lead may be exposed outwardly of the pouch-type case 20, thus acting as an electrode terminal in order to be electrically connected to an external component of a secondary battery, that is, a different secondary battery or an external device.

The electrode assembly 10 may be formed to have a stacked structure, as illustrated in FIG. 1. In this case, a stacked electrode assembly refers to an electrode assembly having a structure in which a plurality of anode plates and cathode plates are included and are alternately stacked, with the separator interposed therebetween.

A case 20 may include an upper case 21 and a lower case 22. In addition, the electrode assembly 10 and an electrolyte may be included in an internal space formed by the upper case 21 and the lower case 22. In the upper case 21 and the lower case 22, a sealing portion S may be formed along an edge thereof in order to seal the internal space. In addition, the sealing portions S may be bonded (sealed) to each other, thus sealing the internal space.

The case 20 may be formed to have a form in which an Al thin film is included, in order to protect an internal component, such as the electrode assembly 10, the electrolyte, and the like, as well as to supplement electrical and chemical properties and improve heat dissipation properties thereof by the electrode assembly 10 and the electrolyte.

In addition, the Al thin film may be interposed between insulating layers, formed using an insulating material, in order to have electrical insulating properties with respect to the internal components of the secondary battery, such as the electrode assembly 10 and the electrolyte, or a different component on an exterior of the secondary battery.

However, a related art pouch-type case may not have a relatively high level of hardness. Therefore, as illustrated in FIG. 3, in a process of injecting the electrolyte thereinto, and discharging gas therefrom, a problem in which a form of a case collapses and is crushed may occur (see arrows).

In a case in which the form of the case collapses, the internal space of the case may not be maintained, but may be reduced. Therefore, a problem in which a space to be filled with the electrolyte is also reduced may occur.

SUMMARY

An aspect of the present inventive concept may provide a battery cell maintaining a form of a case and securing an internal space thereof.

According to an aspect of the present inventive concept, a battery cell comprises a case including a sidewall portion defined as a depth of a receiving space and a planar portion extended from the sidewall portion and completing the receiving space; and an electrode assembly formed in such a manner that a plurality of electrode plates are stacked and accommodated in the receiving space of the case. In addition, the sidewall portion includes a first side wall and a second side wall protruding outwardly of the first side wall and expanding the receiving space.

In the example embodiment, an angle of inclination between the second side wall and a plane on which the planar portion is disposed may be narrower than an angle of inclination between the first side wall and the plane.

In the example embodiment, the angle of inclination of the first side wall may be formed to be wider than the angle of inclination of the second side wall and less than 90°.

In the example embodiment, the battery cell may include a connection portion connecting the first side wall to the second side wall.

In the example embodiment, two fold lines may be formed in portions in which the connection portion meets the first side wall and the second side wall.

In the example embodiment, the two fold lines may be formed in such a manner that ends of each of the two fold lines meet.

According to an aspect of the present inventive concept, a battery cell comprises an electrode assembly including a plurality of electrode plates, which are stacked, and electrode taps extended from each of the plurality of electrode plates; and a case including a first receiving portion receiving the plurality of electrode plates and a second receiving portion receiving the electrode taps. In addition, the first receiving portion and the second receiving portion are formed to have different widths.

BRIEF DESCRIPTION OF DRAWINGS

The above and other aspects, features and other advantages of the present inventive concept will be more clearly understood from the following detailed description when taken in conjunction with the accompanying drawings, in which.

DETAILED DESCRIPTION

Figure 1:
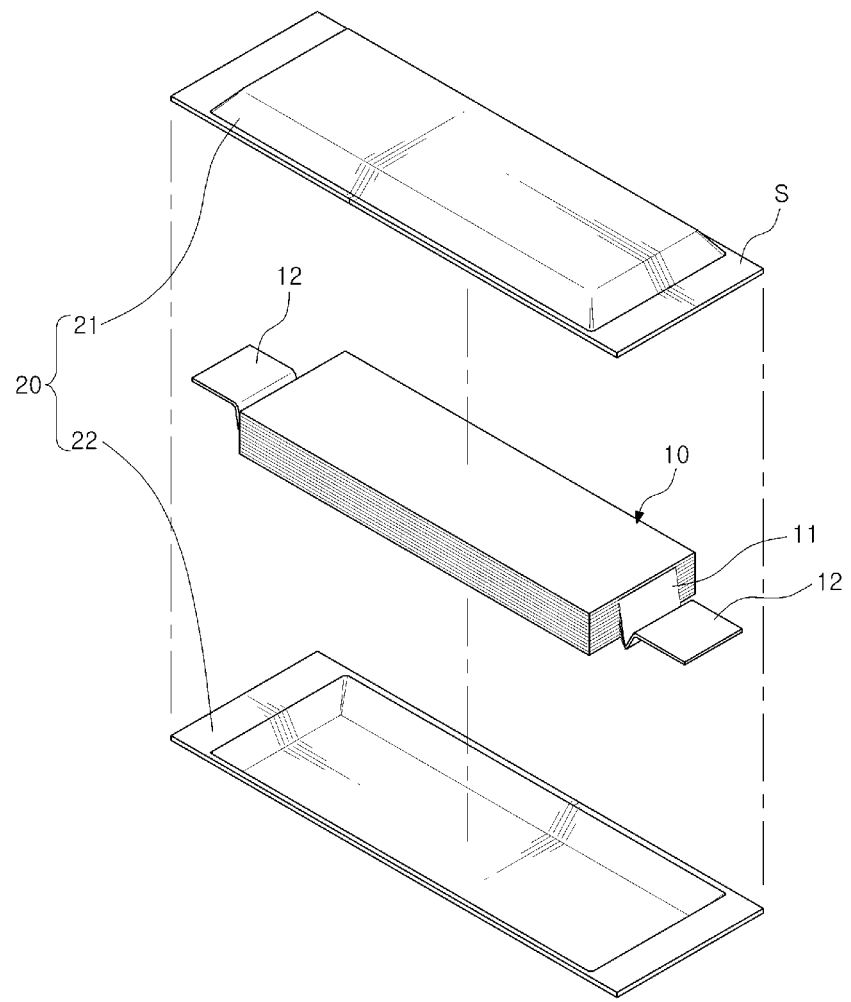
FIG. 1 is an exploded perspective view of a composition of a related art pouch-type battery cell.
Figure 2:
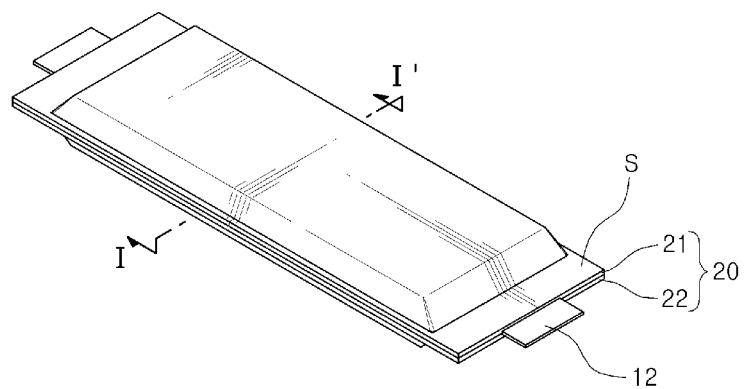
FIG. 2 is a perspective view illustrating an assembled state of the battery cell illustrated in FIG. 1.

The terminology used herein describes particular embodiments only, and the present inventive concept is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

Figure 4:
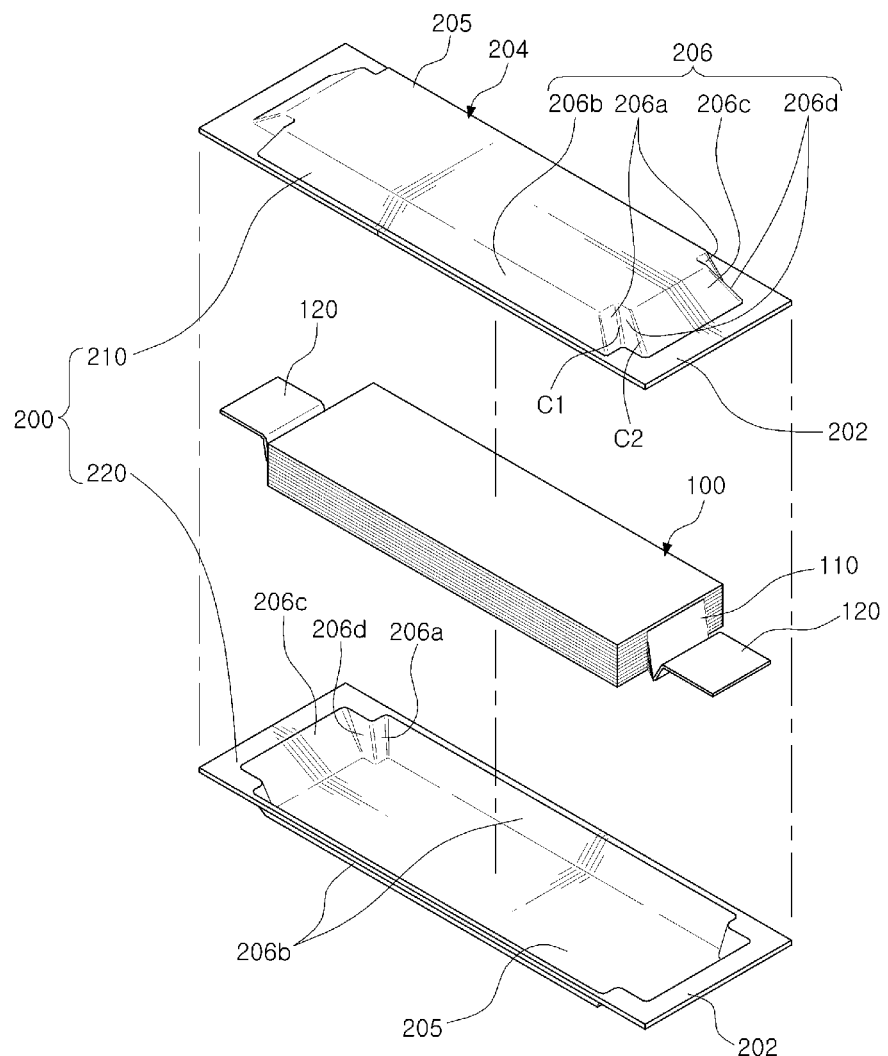
FIG. 4 is a schematic, exploded perspective view of a pouch-type battery cell according to an example embodiment.
Figure 5:
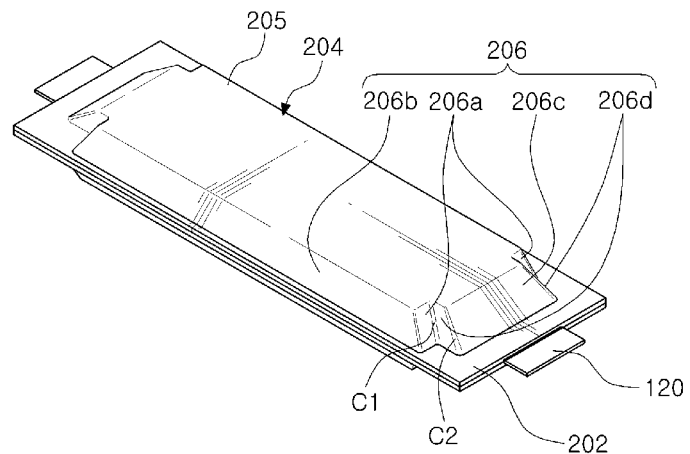
FIG. 5 is a perspective view illustrating an assembled state of the battery cell illustrated in FIG. 4.
Figure 6:
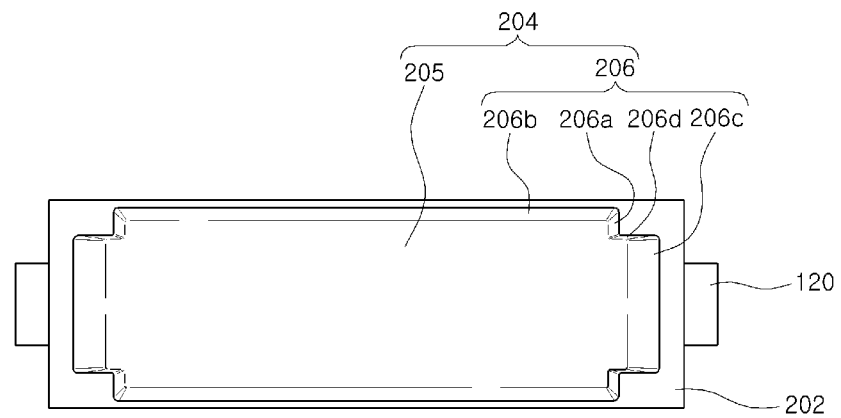
FIG. 6 is a cross-sectional view taken along line II-II' of FIG. 5.
Figure 7:
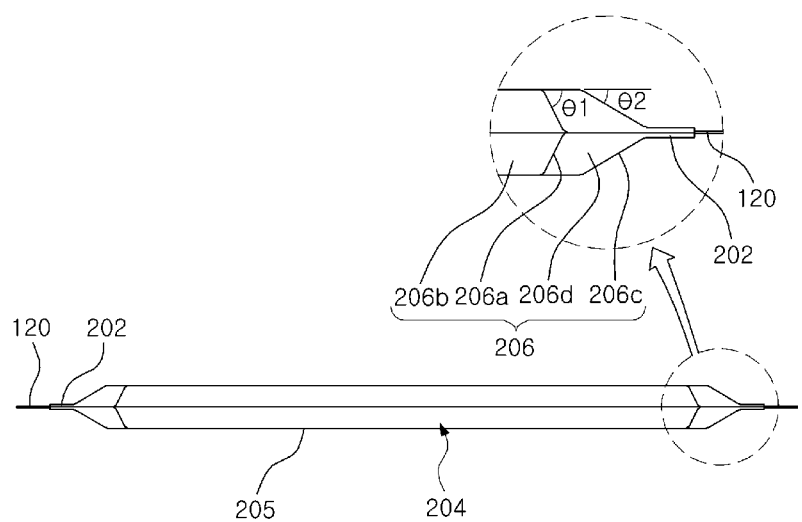
FIG. 7 is a side view of a battery cell illustrated in FIG. 4.

FIG. 4 is a schematic, exploded perspective view of a pouch-type battery cell according to an example embodiment, while FIG. 5 is a perspective view illustrating an assembled state of the battery cell illustrated in FIG. 4. In addition, FIG. 6 is a cross-sectional view taken along line II-II' of FIG. 5, while FIG. 7 is a side view of a battery cell illustrated in FIG. 4.

With reference to FIGS. 4 to 7, a pouch-type battery cell, according to an example embodiment, may include an electrode assembly 100 and a case 200.

The electrode assembly 100 may include a plurality of electrode plates and an electrode tap 110, and may be accommodated in a receiving portion 204 of a case 200. In this case, an electrode plate may include an anode plate and a cathode plate. In addition, the electrode assembly 100 may be formed to have a stacked structure in which relatively wide surfaces of the anode plate and the cathode plate face each other, with a separator interposed therebetween.

The anode plate and the cathode plate may be formed to have a structure in which a current collector is coated with active material slurry. In general, slurry may be formed in such a manner that a granular active material, an auxiliary conductor, a binder, a plasticizer, or the like, to which a solvent is added, is stirred.

Also, the electrode assembly 100 may include a plurality of anode plates and a plurality of cathode plates, stacked in a vertical direction. In this case, each of the plurality of anode plates and the plurality of cathode plates may include the electrode tap 110. In addition, the electrode tap 110 may be in contact with a different electrode tap 110 having the same polarity and connected to an electrode lead 120 having the same polarity.

The case 200 may include a first case 210 and a second case 220. Each of the first case 210 and the second case 220 may include a sealing portion 202 and the receiving portion 204.

The sealing portion 202 may be disposed as an edge portion along a perimeter of the receiving portion 204.

The sealing portion 202 of the first case 210 and the sealing portion 202 of the second case 220 may be bonded to each other, and may close an internal space formed by the receiving portion 204.

The sealing portions 202 may be bonded using a heat fusion method, but the present inventive concept is not limited thereto. In addition, in order to significantly reduce an area of the sealing portions 202, the sealing portions 202 may be formed to have a form of being folded at least once after being bonded together.

The receiving portion 204 may be formed to have a form of a container and provide an internal space. In this case, the sealing portion 202 may be formed to be expanded at an end of the receiving portion 204 formed to have the form of a container.

The internal space of the receiving portion 204 may include the electrode assembly 100 and an electrolyte (not illustrated). The receiving portion 204 may be formed in an entirety of the first case 210 and the second case 220, as illustrated in FIG. 4. However, the receiving portion 204 may be formed in only one of the first case 210 and the second case 220, according to need.

Furthermore, the receiving portion 204, according to the example embodiment, may include a planar portion 205 and a sidewall portion 206.

The planar portion 205 may be provided as a surface having a relatively large area, and may provide a bottom surface or an upper surface of the internal space of the receiving portion 204. Therefore, the planar portion 205 may be formed in such a manner that the planar portion 205 is extended from the sidewall portion 206 and completes the internal space.

In addition, the planar portion 205 may be formed to have a size corresponding to an area of the electrode assembly 100 and formed to be substantially parallel with the sealing portion 202.

The sidewall portion 206 may be extended from the sealing portion 202 and connected to a perimeter of the planar portion 205.

Therefore, the sidewall portion 206 may be defined as a depth of the internal space of the receiving portion 204.

The sidewall portion 206 may include a first side wall 206a, a third side wall 206b, a second side wall 206c, and a connection portion 206d.

With reference to FIG. 4, the first side wall 206a may be formed on opposing sides of the battery cell, formed to have a quadrangular shape. In this case, two sides on which the first side wall 206a is formed may be provided as sides from which an electrode lead 120 of the electrode assembly 100 protrudes. In the case of the example embodiment, the electrode lead 120 may protrude from a rectangular short side formed by the battery cell. Therefore, the first side wall 206a may be disposed on the short side.

The third side wall 206b may be formed on opposing sides of the planar portion 205, and may be disposed on a long side of the battery cell, perpendicular to the first side wall 206a.

As illustrated in FIG. 7, an angle of inclination between the first side wall 206a and the sealing portion 202 or between the first side wall 206a and the planar portion 205 may be defined as θ1. An angle of inclination of the third side wall 206b may be defined as being wider than the angle of inclination θ1 of the first side wall 206a, but a composition of the present inventive concept is not limited thereto.

In a manner the same as an example embodiment to be subsequently described, angles of inclination of the first side wall 206a and the third side wall 206b may be formed to be equal, or the angle of inclination of the third side wall 206b may be formed to be narrower than the angle of inclination of the first side wall 206a.

In a manner the same as the first side wall 206a, the second side wall 206c may be disposed on the short side of the battery cell, in which the electrode lead 120 is disposed, and may be interposed between the first side walls 206a.

Therefore, each of the first side walls 206a may be formed in a corner of the battery cell, while the second side wall 206c may be disposed to protrude outwardly of the first side walls 206a.

As illustrated in FIG. 7, an angle of inclination between the second side wall 206c and the sealing portion 202 or between the second side wall 206c and the planar portion 205 may be defined as θ2. In this case, the angle of inclination θ2 of the second side wall 206c may be defined as being narrower than the angle of inclination θ1 of the first side wall 206a.

Therefore, the angle of inclination θ1 of the first side wall 206a may be formed to be wider than the angle of inclination θ2 of the second side wall 206c and less than 90°. In addition, the second side wall 206c may be formed to further protrude outwardly of the first side wall 206a in a direction toward the sealing portion 202.

The battery cell, according to the example embodiment, may be maintained to have the same size as that of a related art battery cell illustrated in FIG. 1. Therefore, as the second side wall 206c outwardly protrudes, a bonding area of the sealing portion 202, in which the second side wall 206c is formed, may be reduced.

The second side wall 206c may protrude to the maximum extent within a range in which bonding reliability of the sealing portion 202 may be maintained.

The connection portion 206d, connecting the first side wall 206a to the second side wall 206c, may be formed on opposing ends of the second side wall 206c.

As the second side wall 206c is formed at an angle of inclination different from that of the first side wall 206a, the connection portion 206d may connect the first side wall 206a to the second side wall 206c, and may be interposed between a first fold line C1 and a second fold line C2. In this case, the first fold line C1 may be provided as a fold line formed in a portion in which the first side wall 206a meets the connection portion 206d. In addition, the second fold line C2 may be provided as a fold line formed in a portion in which the connection portion 206d meets the second side wall 206c.

The case 200 may be formed to be bent in different directions in the first fold line C1 and the second fold line C2. Therefore, a side portion 206 of the receiving portion 204 may have a relatively high level of hardness, in order to prevent deformation of an outer shape of the case 200.

Figure 3:
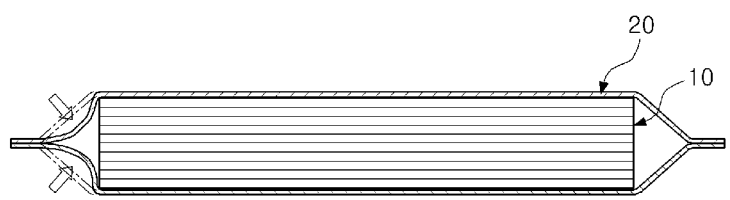
FIG. 3 is a cross-sectional view taken along line I-I' of FIG. 2.

In the case of the related art, in a process of injecting the electrolyte into a case, and discharging gas therefrom, a problem in which a form of the case collapses, and a portion thereof is crushed may occur. In this case, since a side wall of the case generally collapses, and an internal space of the case is reduced, as illustrated in FIG. 3, a space filled with the electrolyte may also be reduced.

Therefore, a required amount of electrolyte may not be injected thereinto, or the electrolyte may flow between the electrode assembly 100 and the planar portion 205, so that the planar portion 205 may be disposed to be spaced apart from the electrode assembly 100. Thus, the battery cell has been manufactured to have a form in which opposing surfaces of the battery cell swell.

However, the battery cell, according to the example embodiment, may include the first side wall 206a and the second side wall 206c having different angles of inclination, formed on a side from which the electrode lead 120 protrudes. In addition, since the angles of inclination of the first side wall 206a and the second side wall 206c may be different, a plurality of fold lines C1 and C2 may be formed between the first side wall 206a and the second side wall 206c.

The first fold line C1 and the second fold line C2 may be formed to be bent in opposite directions, thus increasing a level of hardness supporting the planar portion 205. Therefore, even in the case that the gas in the case 200 is removed, ease of collapse of the sidewall portion 206 of the case 200 may not be facilitated.

Therefore, since a maximum internal space may be secured, the internal space may be sufficiently filled with the electrolyte, thus preventing the opposing surfaces of the battery cell from swelling.

Also, the first side wall 206a and the third side wall 206b may be in contact with the electrode assembly 100 in as great an area as possible, and may allow the electrode assembly 100 to be fixed. Therefore, even in the case that the second side wall 206b is outwardly extended, movement of the electrode assembly 100 in the case 200 may be suppressed.

Furthermore, a receiving space of the case, according to the example embodiment, may include the first side wall 206a and the second side wall 206c having different angles of inclination. Therefore, the receiving space may be divided into a first receiving portion, formed by the first side wall 206a and the third side wall 206b, and a second receiving portion, formed by the second side wall 206c. In addition, the first receiving portion may be used as a space in which a stacked electrode plate is accommodated, while the second receiving portion may be used as a space in which electrode taps 110, extended from the electrode plate and the electrode lead 120, are accommodated.

Therefore, the first receiving portion and the second receiving portion may be formed to have different widths.

In the meantime, the example embodiment illustrates a case in which the second side wall 206c is formed only on the short side, in which the electrode lead is disposed, as an example, but a composition of the present inventive concept is not limited thereto. For example, the second side wall 206c may also be formed on the long side in which the third side wall 206b is formed. However, a width of the sealing portion may be relatively significantly narrow on the third sidewall 206b. Therefore, in a case in which the second side wall 206c is formed on the third side wall 206b, a width of the battery cell may be increased.

The present inventive concept is not limited to the example embodiment described above, and may be variously modified.

Figure 8:
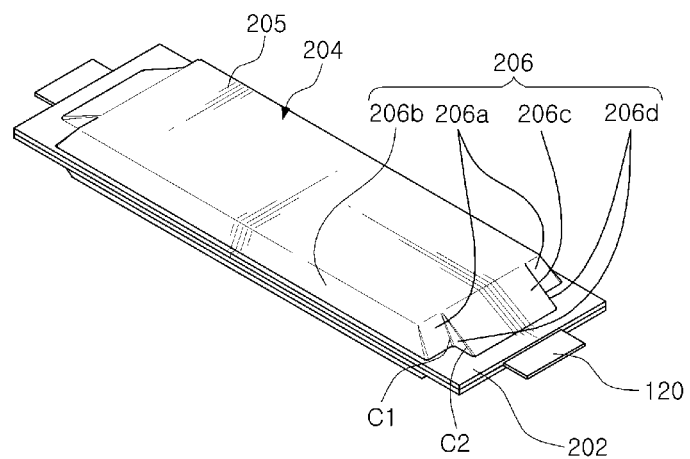
FIG. 8 is a schematic perspective view of a battery cell according to a different example embodiment of the present inventive concept.

FIG. 8 is a schematic perspective view of a battery cell according to a different example embodiment of the present inventive concept.

In the case of the example embodiment, the battery cell may be configured in a manner similar to the battery cell in an example embodiment described above, and may be different only in a structure of a third side wall. Accordingly, a description of the same components as those of an example embodiment described above will be omitted, and only differences therebetween will be described.

With reference to FIG. 8, the battery cell, according to the example embodiment, may be formed so that a first side wall 206a and a third side wall 206b may have the same angle of inclination.

In addition, one ends of a first fold line C1 and a second fold line C2 may be formed to meet a planar portion 205 at a point, while the other ends of the first fold line C1 and the second fold line C2 may be formed to meet a sealing portion 202 at different points.

Due to a composition described above, the planar portion 205 may be formed to have a completely rectangular shape, thus allowing the fixing of an electrode assembly more stably thereto.

As set forth above, according to example embodiments of the present inventive concept, a battery cell, in which ease of collapse of a sidewall portion of a case may not be facilitated, even in the case that gas in the case is removed, may be provided. Therefore, a maximum internal space may be secured and filled with a sufficient amount of an electrolyte. In addition, opposing surfaces of a battery cell may be prevented from swelling.

While example embodiments have been shown and described above, it will be apparent to those skilled in the art that modifications and variations could be made without departing from the scope of the present inventive concept, as defined by the appended claims.

What is claimed is:

1. A battery cell comprising:
a case including a sidewall portion defined as a depth of a receiving space, a planar portion extended from the sidewall portion and completing the receiving space, and a sealing portion formed at an edge of the case, wherein the sidewall portion forms two long sides opposite to each other and two short sides opposite to each other;
an electrode assembly having a rectangular shape the electrode assembly being formed in such a manner that a plurality of electrode plates are stacked and accommodated in the receiving space of the case; and
two electrode leads connected to the electrode assembly and protruded through the short sides of the sidewall portion, respectively;
wherein each of the short sides of the sidewall portion includes two first side walls which are substantially perpendicular to the planar portion of the case, one second side wall disposed between the two first side walls for expanding the receiving portion toward the direction of the electrode leads and two connection portions connecting the two first side walls to the second side wall, respectively,
wherein each of the first side walls, the second side wall, and the connection portions connect the planar portion to the sealing portion,
wherein each of the short sides of the sidewall portion further includes first bending portions formed in respective portions in which the first side walls meet their respective connection portions, and second bending portions formed in respective portions in which the second side walls meet their respective connection portions,
wherein the two connection portions are interposed between the first bending portions and the second bending portions, respectively, and
wherein an angle of inclination between the second side wall and a plane on which the planar portion is disposed is narrower than an angle of inclination between the first side walls and the plane.

2. The battery cell of claim 1, wherein the angle of inclination of the first side walls is formed to be wider than the angle of inclination of the second side walls and less than 90°.

3. The battery cell of claim 1, wherein the first and the second bending portions are formed in such a manner that one end of the first bending portions and one end of the second bending portions meet.

4. The battery cell of claim 1, wherein the electrode assembly includes electrode taps extended from each of the plurality of electrode plates,
wherein the case includes a first receiving portion receiving the plurality of electrode plates and a second receiving portion receiving the electrode taps, and
wherein the first receiving portion and the second receiving portion are formed to have different widths.

5. A battery cell, comprising:
a case including a sidewall portion, a sealing portion formed at an edge of the case, and a planar portion closing the sidewall portion to form a receiving portion for receiving an electrode assembly, the sidewall portion forming two long sides opposite to each other and two short sides opposite to each other;
the electrode assembly having a stacked structure being enclosed within the receiving portion of the case; and
first and second electrode leads protruding through the short sides of the sidewall portion, respectively;
wherein each of the short sides of the sidewall portion includes two first side walls which are substantially vertical, and a receiving portion extension disposed between the two first side walls for expanding the receiving portion toward the direction of the electrode leads, wherein the receiving portion extension is formed with a second side wall and two connection portions connecting the second side wall with the two first side walls, respectively, and wherein each of the first side walls, the second side wall, and the connection portions connect the planar portion to the sealing portion, wherein each of the short sides of the sidewall portion further includes first bending portions formed in respective portions in which the first side walls meet their respective connection portions, and second bending portions formed in respective portions in which the second side wall meet their respective connection portions, wherein the two connection portions interposed between the first bending portions and the second bending portions, respectively, wherein an angle of inclination of the first side walls is formed to be wider than an angle of inclination of the second side wall and less than 90°.

6. The battery cell of claim 5, wherein the first and the second bending portions are formed in such a manner that one end of the first bending portions and one end of the second bending portions meet.

7. The battery cell of claim 6, wherein the electrode assembly includes electrode taps extended from each of a plurality of electrode plates to connect to the electrode lead.

8. The battery cell of claim 7, wherein the receiving portion extension houses the plurality of electrode taps.

9. The battery cell of claim 8, wherein the case includes an upper case and a lower case.

10. A battery cell, comprising:
an upper case including an upper sidewall portion, an upper sealing portion formed at an edge of the upper case, and an upper planar portion closing a top surface of the upper sidewall portion to form an upper receiving portion;

a lower case including a lower sidewall portion, a lower sealing portion formed at the edge of the lower case, and a lower planar portion closing a bottom surface of the lower sidewall portion to form a lower receiving portion; and an electrode assembly having a stacked structure being enclosed within the upper and lower receiving portions of the case;

wherein the lower sidewall portion and upper sidewall portion form two long sides opposite to each other and two short sides opposite to each other, wherein a positive electrode lead protrudes through the case at a first short side thereof, wherein a negative electrode lead protrudes through the case at a second short side thereof opposite to the first short side, wherein the upper and lower sealing portions of the case are sealed against each other and around the positive and negative electrode leads to form a case sealing portion, wherein each of the short sides of the case includes two first side walls which are substantially perpendicular to the upper and lower planar portions, and a receiving portion extension disposed between the two first side walls for expanding the receiving portion toward the direction of the electrode lead, wherein the receiving portion extension is formed with a second side wall and two connection portions connecting the second side wall with the two first side walls, respectively, wherein each of the first side walls, the second side wall, and the connection portions connect the planar portion to the sealing portion, and wherein an angle of inclination of the second side wall with respect to the upper planar portion and an angle of inclination of the second side wall with respect to the lower planar portion is less than the angle of inclination of the two first side walls with the upper and lower planar portions and less than 90°.

* * * * *